United States Patent
Ramsden

(10) Patent No.: US 8,384,016 B2
(45) Date of Patent: Feb. 26, 2013

(54) STABILIZATION IN GAMMA-RAY SPECTOMETRY

(75) Inventor: David Ramsden, Southampton (GB)

(73) Assignee: Symetrica Limited, Southampton, Hampshire (GB)

( * ) Notice: Subject to any disclaimer, the term of this patent is extended or adjusted under 35 U.S.C. 154(b) by 0 days.

(21) Appl. No.: 13/120,153

(22) PCT Filed: Jul. 28, 2009

(86) PCT No.: PCT/GB2009/001856
§ 371 (c)(1),
(2), (4) Date: May 17, 2011

(87) PCT Pub. No.: WO2010/034962
PCT Pub. Date: Apr. 1, 2010

(65) Prior Publication Data
US 2011/0211675 A1    Sep. 1, 2011

(30) Foreign Application Priority Data
Sep. 23, 2008   (GB) .................................. 0817432.8

(51) Int. Cl.
*G01D 18/00*    (2006.01)
(52) U.S. Cl. .................................................. 250/252.1
(58) Field of Classification Search ................ 250/252.1
See application file for complete search history.

(56) References Cited

U.S. PATENT DOCUMENTS

| 3,296,438 | A | * | 1/1967 | Main ............................. 250/364 |
| 5,871,708 | A | * | 2/1999 | Park et al. .................... 424/1.25 |
| 7,824,660 | B2 | * | 11/2010 | Buzatu et al. ................ 424/1.49 |
| 2005/0116186 | A1 | * | 6/2005 | Weisner et al. ............ 250/505.1 |
| 2006/0231768 | A1 | * | 10/2006 | Rackham et al. ............. 250/395 |
| 2008/0212859 | A1 | * | 9/2008 | Da Silva et al. .............. 382/131 |
| 2011/0006195 | A1 | * | 1/2011 | Prendergast et al. ...... 250/252.1 |

FOREIGN PATENT DOCUMENTS

| EP | 0189645 A1 | 8/1986 |
| EP | 0414587 A1 | 2/1991 |
| EP | 0416970 A2 | 3/1991 |
| EP | 0620452 A1 | 10/1994 |
| WO | WO 2008/088386 A2 | 7/2008 |

* cited by examiner

*Primary Examiner* — Kiho Kim
(74) *Attorney, Agent, or Firm* — O'Melveny & Myers LLP

(57) ABSTRACT

A calibration source comprises a radioactive material comprising a radioactive isotope having a decay transition associated with emission of a radiation particle and gamma-rays having a known energy and a solid-state detector, arranged to receive radiation particles emitted from the radioactive material. A gating circuit is coupled to the solid-state detector and is operable to generate a gating signal in response to detection of a radiation particle in the solid-state detector. The gating signal may thus be used as an indicator that an energy deposit in a nearby gamma-ray spectrometer is associated with a decay transitions in the radioactive isotope. Since these energy deposits are of a known energy, they can be used as reference points to calibrate the spectrometer response. Thus with calibration sources according to embodiments of the invention, spectral stabilization may be performed in real time and in parallel with obtaining a spectrum of observed signal events.

14 Claims, 3 Drawing Sheets

STABILIZATION IN GAMMA-RAY SPECTOMETRY

BACKGROUND ART

The invention relates to gamma-ray spectrometry, and in particular to calibration sources for gamma-ray spectrometers and gamma-ray spectrometers having calibration sources.

Gamma-ray spectrometers are used in a wide variety of applications, for example to identify and monitor gamma-ray sources in scientific, industrial, and environmental monitoring applications, e.g. for security screening of personnel and cargo at border crossings, or to search generally for orphaned radioactive sources. A common class of gamma-ray spectrometers is based on organic (plastic) or inorganic (crystal) scintillator materials.

FIG. 1 shows an example of a conventional crystal scintillation spectrometer 2. The spectrometer is generally axially symmetric with a diameter of around 8 cm and a length of around 8 cm. The spectrometer 2 comprises a scintillation crystal 4 which scintillates when a gamma-ray is absorbed within it. A common scintillation crystal material is thallium doped sodium iodide (NaI(Tl)). There are, however, various other scintillator crystals, and also scintillator plastics, that may be used.

The scintillation crystal 4 is in a hermetically sealed body 6 with $Al_2O_3$ powder packing arranged around the crystal 4 to act as a reflective material. A glass entrance window 8 is situated on the upper end-face of the package. Gamma-rays from a source enter the spectrometer through the entrance window 8. Gamma-rays interact with the scintillation crystal 4 in scintillation events in which lower-energy photons are generated, e.g. optical photons. The scintillation crystal 4 is optically coupled to a photomultiplier tube (PMT) 10 for detecting photons generated in the scintillation crystal 4 in gamma-ray detection events. Thus the PMT 10 is operable to output a signal indicative S of the intensity of the scintillation flash generated in the crystal 6 in response to each gamma-ray interaction. The intensity of the flash depends on the amount of the energy of the incident gamma-ray deposited in the crystal.

Output signals S from the PMT 10 are routed to a spectrum analyser 12, e.g. a multi-channel analyser. The amplitudes of the respective output signals S are indicative of the energy of the corresponding incident gamma-rays deposited in the crystal. The relationship between an energy deposit D in the scintillation body 4 and an resulting output signal S is defined by a response function of the spectrometer.

The spectrum analyser 12 is operable to process the output signals received from the PMT in a given integration time (or in an accumulating manner) and to generate an energy loss spectrum for the corresponding detection events. This requires the spectrum analyser 12 to convert the measured output signals S to estimates of the energy deposited D in the gamma-ray detector in the corresponding events. The mapping from output signals S to energy deposit D is defined by a calibration function. The calibration function is selected to provide an inverse to the response function for the spectrometer. That is to say, if an energy deposit $D_0$ in a crystal is converted to an output signal $S_0$ in accordance with the spectrometer's response function, the aim of the calibration function is to invert the spectrometer's response so as to convert the output signal $S_0$ back to an estimate of the energy deposit $D_0$.

The general principles underlying the of application of calibration functions to in effect undo a gamma-ray spectrometer's response function are well known. The calibration function may, for example, be based on a look-up table, or a functional relationship that provides for a conversion of an observed signal amplitude S to an estimated energy deposit D. The calibration function may be based on empirical observations of calibration sources having known spectra, or theoretical predictions.

By way of an example of a spectrometer's response to an energy deposit, an energy loss of 1 MeV in a NaI(Tl) scintillator crystal such as shown in FIG. 1 might generate around $n_\gamma$=38,000 photons. The $Al_2O_3$ powder surrounding the scintillator crystal provides for relatively high diffuse reflectance, typically providing a transfer efficiency T such that that perhaps 85% or so of generated photons are transferred to the photo-cathode of the PMT 10. The quantum-efficiency QE of a PMT at the wavelength of interest is typically around 25%. Thus the number of charge-carriers $N^{cc}$ released from the photo-cathode of the PMT in response to the 1 MeV energy deposit will be around 8,000 (i.e. $n_\gamma*T*QE$, where $n_\gamma$=38,000, T=0.85, and QE=0.25). The output signal S from the PMT will thus be $8000G_0$ (in arbitrary units), where $G_0$ is a measure of the gain of the PMT. Thus the calibration function here should ideally be defined such that an output signal of $8000G_0$ is mapped back to an energy loss of 1 MeV.

As noted above, the general principles underlying the application of calibration functions to gamma-ray spectrometer data are well understood. For example it is known that a spectrometer response function will generally be non-linear (i.e. a twice-as-high energy deposit D in the scintillation crystal will not in general correspond with a twice-as-high output signal S from the PMT). Some aspects of an arbitrary spectrometer response function are represented in Table 1. It will be appreciated, however, that this is purely a simple example for the purposes of explanation, it is not intended to reflect the true response characteristics of any particular scintillation spectrometer.

TABLE 1

| Energy deposit D (MeV) | PMT Output signal S (arbitrary units) |
| --- | --- |
| 0.7 | 6230 * $G_0$ |
| 0.8 | 6880 * $G_0$ |
| 0.9 | 7470 * $G_0$ |
| 1.0 | 8000 * $G_0$ |
| 1.1 | 8470 * $G_0$ |
| 1.2 | 8880 * $G_0$ |
| 1.3 | 9230 * $G_0$ |

The PMT output signals S shown in Table 1 is the product of two basic parameters, namely the number of charge carriers $N^{cc}$ generated at the photo-cathode of the PMT (e.g. 8000 at 1 MeV), and the gain of the PMT ($G_0$). As noted above, the spectrum analyser component of the gamma-ray spectrometer is operable to convert an observed PMT output signal S to an estimated energy deposit D in the crystal. This could be done by reference to a look-up table such as represented in Table 1, but more likely will be done by applying a functional parameterisation of the calibration. For example, the spectrometer response function represented in Table 1 may be parameterised as $$S = (11000*D - 3000*D^2)*G_0 \qquad \text{(Equation 1)}.$$

This equation may be solved for a given observed output signal S to provide an estimate of energy loss D.

A problem with scintillator-based gamma-ray spectrometers is that the number of charge carriers $N^{cc}$ generated at the photo-cathode of a PMT for a given gamma-ray energy deposit in a given spectrometer is not necessarily constant. For example, the number of charge carriers $N^{cc}$ depends relatively strongly on the temperature of the spectrometer (primarily because the number of photons $n_\gamma$ generated in the energy deposit depends on the temperature of the scintillation crystal). This means the spectrometer's response function can vary with changing conditions. As such any assumed calibration function for converting from output signal S to incident energy deposit D will only be correct for some conditions (i.e. the conditions for which the calibration function was originally determined). This is problematic because a failure to properly map output signals S back to energy deposits D will lead to a poorly calibrated spectrum, e.g. with peaks appearing at the wrong energies. The problem of a spectrometer's response changing according to different conditions arises to some extent in all gamma-ray spectrometers, and not just in scintillator-based spectrometers.

A known way of dealing with this problem is to adjust the gain of the acquisition system (e.g. of the PMT itself, or of an associated signal amplifier). This is generally known as stabilisation.

Stabilisation may, for example, be achieved by adjusting system gain in response to measured changes in environmental conditions so as to compensate for corresponding changes in the spectrometer's response. For example, suppose the response function represented in Table 1 was applicable for a spectrometer at 20° C., and there was known to be a 1% drop in $N^{cc}$ for each 1° C. rise in temperature. This means at a temperature of 30° C., an energy deposit of 1 MeV would generate only around 7200 charge carriers (as opposed 8000 at 20° C.), and hence an output signal of $S=7200*G_0$ would be seen. If no account were taken of the change in environmental conditions, this output signal would be mapped back to an estimated energy deposit of between 0.8 and 0.9 MeV, and so result in an inaccurate energy-loss spectrum. Thus it is known to monitor the temperature of a spectrometer and to compensate for changes in the number of charge carriers generated for a given energy deposit by applying a corrective temperature-dependent calibration factor f to the PMT gain. For example, if the temperature changed by an amount known to cause a 10% fall in charge carriers, the PMT gain could be increased by 11% to compensate. Thus for the 30° C. example give above, the output signal would become $S=N^{cc}*f*G_0=7200*1.11*G_0=8000\ G_0$. This would then be correctly mapped back to an energy deposit of 1 MeV by reference to the calibration function represented in Table 1. A problem with this approach is that it is difficult to monitor changes in environmental conditions, and to model their impact on a spectrometer's response, with high accuracy.

Another approach for providing stabilisation is based on monitoring the response of a spectrometer to a source of calibration gamma-rays of known energy(ies). A calibration factor f may then be applied to the PMT gain (or other data acquisition system gain), where f is selected such that output signals associated with calibration gamma-rays are correctly mapped back to the known energy of these calibration events. For example, a servo loop may be provided with the system gain being adjusted in response to apparent differences between the known energies for calibration events and the energies determined from their output signals S via the assumed calibration function. An advantage of this approach is that all changes in the spectrometer's response function can be accounted for simultaneously regardless of cause. However the approach must be performed separately from data acquisition from a target of interest, or requires a technique for distinguishing calibration events from "real" events so that the calibration events do not contaminate the energy loss spectrum determined for the real events.

Previously proposed schemes for calibration-source-based stabilisation have employed calibration isotopes (e.g. Co-60, Cs-137 or Na-22) to dope a small plastic secondary scintillation detector viewed by a separate PMT to provide an electronic gating signal each time that a beta-particle is detected in the plastic [1, 2]. Gamma-rays detected in a main detector at the same time as a beta-detection event in the secondary detector are taken to be associated with the calibration source, and hence of a known energy. These can be processed separately from other events and used to provide spectral stabilization. This approach results in relatively bulky spectrometers and is not practical for use in all situations, e.g. for use in compact hand-held gamma-ray spectrometers.

Another previously proposed scheme has used Na-22 as a calibration source between a primary spectrometer and a secondary gamma-ray detector. The approach relies on the fact that Na-22 emits a positron which promptly annihilates to produce a pair of 511 keV photons propagating in opposite directions. If one of the annihilation gamma-rays is detected in the secondary gamma-ray detector, this can be used to provides an electronic signal that can be used to label simultaneous events in the primary spectrometer as being associated with the Na-22 calibration source [3]. This again allows the calibration events to be separated from "real" events. The system gain can then be adjusted so the energies for the Na-22 emissions determined using the primary spectrometer match the known emission energies for this isotope, thereby simultaneously stabilizing the observed spectrum for the real events.

Another technique widely used in stabilizing the gain of gamma-ray spectrometers is based on the incorporation of a weak alpha-emitting source, e.g. Am-241, into the scintillation crystal assembly. The alpha-particles from the Am-241 then generate a large energy-deposit in the crystal which is beyond the energy-range of interest of most gamma-ray spectrometers (~4 MeV). A servo-loop may then be set to maintain this peak at a constant position in the spectrum as temperature, and other environmental conditions, change. This helps ensure the gamma-ray spectrum recorded at the same time is stabilized [4]. However, in addition to emitting 4 MeV alpha particles, Am-241 also emits 59 keV gamma-ray emission. There is no way of identifying these events in an observed spectrum to separate them from "real" events in this energy region, that is to say, the calibration source contaminates the observed spectrum. This makes the approach unsuitable for many systems isotope identification systems which need to be able to reliably identify isotopes having emission lines in this energy region, including Am-241 itself.

There is therefore a need for improved calibration sources for use with gamma-ray spectrometers.

SUMMARY OF THE INVENTION

According to a first aspect of the invention there is provided a calibration source for a gamma-ray spectrometer, the calibration source comprising: a radioactive material comprising a radioactive isotope having a decay transition associated with emission of a radiation particle and a gamma-ray having a known energy; a solid-state detector arranged to receive radiation particles emitted from the radioactive material; and a gating circuit coupled to the solid-state detector, and wherein the gating circuit is operable to generate a gating signal in response to detection of a radiation particle in the solid-state detector, and to output the gating signal for receipt by a data acquisition circuit of a gamma-ray spectrometer to indicate that gamma-ray detection in the gamma-ray spectrometer occurring within a time window defined by the gating signal is associated with a decay transition in the radioactive isotope.

Thus a compact calibration source for tagging gamma-ray emission as an indicator of their being associated with calibration events may be provided. The calibration source may be used in conjunction with a gamma-ray spectrometer to help stabilise the spectrometer's response by allowing comparison of a derived spectrum of the calibration events (i.e. events indicated as being associated with a decay transition in the radioactive isotope) with the known energy/possible energies of these events. A calibration spectrum can thus be provided continuously and in quasi-real time for use in a gain-stabilization system for the spectrometer with relatively little contamination of a spectrum being observed.

The solid state (semiconductor) detector may comprise first and second detector elements on opposing sides of the radioactive material. The solid-state detector may, for example, be silicon-based, e.g. a P-Intrinsic-N (PIN) diode-based detector.

The gating circuit may comprise a signal amplifier and a signal discriminator with conventional trigger signal processing techniques being employed.

The solid-state detector may be arranged around the radioactive material so as to subtend a solid angle of at least a fraction selected from the group comprising 0.5, 0.6, 0.7, 0.8, 0.9 and 0.95 of a closed surface ($4\pi$). This can help to ensure a correspondingly relatively large fraction of particles emitted by the radioactive material are captured by the solid state detectors.

A characteristic extent of the solid-state detector, e.g. a side length, or a diameter, may be greater than a characteristic extent of the radioactive material by a factor selected from the group comprising at least 5, 6, 7, 8, 9 and 10. This can also help to ensure a relatively large fraction of particles emitted by the radioactive material are captured by the solid state detectors.

The radiation particle may be a beta particle, for example a beta-plus particle (positron). A positron has the advantage of further producing two 511 keV annihilation gamma-rays which may also be detected by an associated gamma-ray spectrometer and used as calibration points for monitoring the spectrometer's response. In principle the radiation particle could be an alpha particle, but alpha particles will in general be less able to escape the radioactive source and reach the solid state detector.

The radioactive material, e.g. Na-22, may have a radioactivity level in a range selected from the group comprising 10 Bq to 500 Bq, 50 Bq to 300 Bq, and 75 Bq to 150 Bq. In many circumstances this will provide a reasonable number of calibration events without swamping an observed signal of interest. The radioactive material may be sealed in a housing, e.g. a laminated plastic film, for safety while helping to ensure particles can readily escape to the solid-state detector.

According to a second aspect of the invention there is provided an apparatus comprising a calibration source according to the first aspect of the invention, and a gamma-ray spectrometer, wherein the gamma-ray spectrometer comprises a data acquisition circuit operable to processing a detection signal associated with a gamma-ray detection occurring within the time window defined by the gating signal, to calculate an energy for the detection event, to compare the calculated energy for the detection event with the known energy of gamma-rays from the radioactive material in the calibration source, and to determine a correction factor for the data acquisition circuit based on a difference between the calculated energy and the known energy.

According to a third aspect of the invention there is provided a method of calibrating a gamma-ray spectrometer comprising: providing a solid-state detector arranged to receive radiation particles emitted from a radioactive material comprising a radioactive isotope having a decay transition associated with emission of a radiation particle and a gamma-ray having a known energy; generating a gating signal in response to detection of a radiation particle in the solid-state detector; and identifying a gamma-ray detection in the gamma-ray spectrometer occurring within a time window defined by the gating signal.

The method may further comprise calculating an energy for the gamma-ray detection event identified as occurring within a time window defined by the gating signal by processing a detection signal associated with the gamma-ray detection in a data acquisition circuit of the gamma-ray spectrometer, comparing the calculated energy for the gamma-ray detection with the known energy of gamma-rays from the radioactive material in the calibration source, and determining a correction factor for the data acquisition circuit based on a difference between the calculated energy and the known energy.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
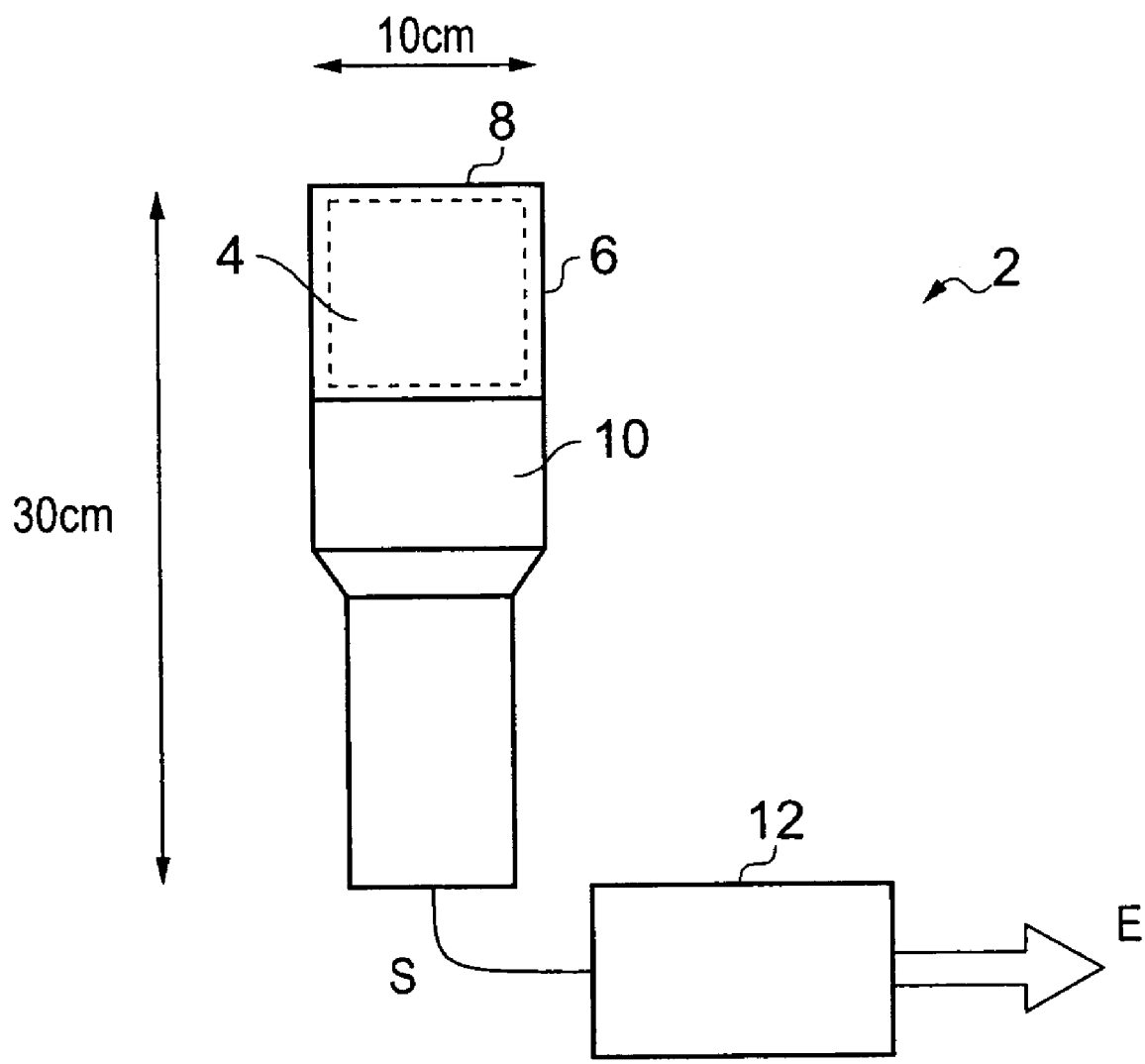
FIG. 1 schematically shows a conventional scintillator-based gamma-ray spectrometer.
Figure 2:
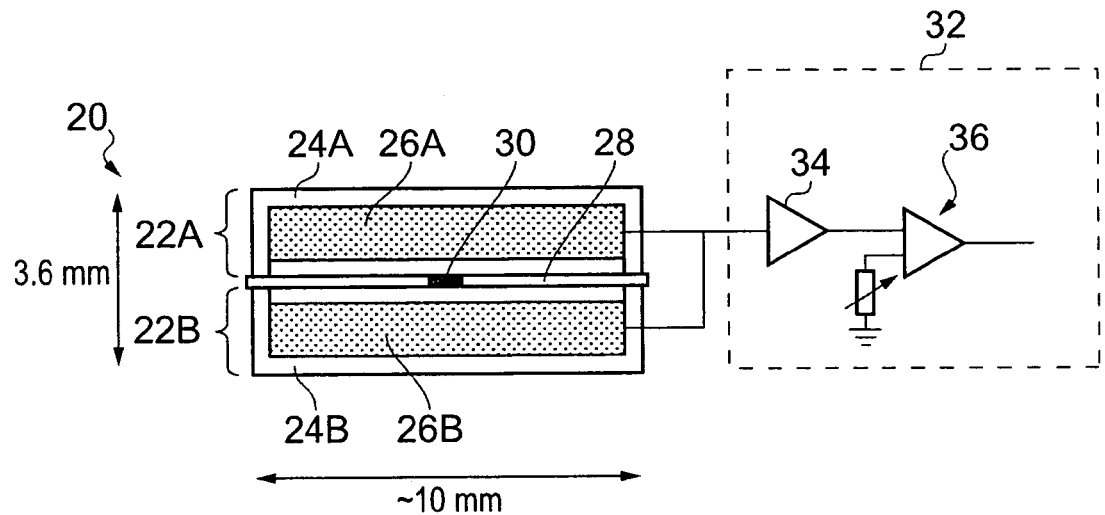
FIG. 2 schematically shows a section view of a calibration source according to an embodiment of the invention.

FIG. 2 schematically shows a calibration source 20 according to an embodiment of the invention. The calibration source 20 is based around a deposit of radioactive material 30 comprising a radioactive isotope having a decay transition associated with emission of a radiation particle and a gamma-ray. In this example, the radioactive material comprises a salt of Na-22. Na-22 is associated with a radioactive transition that results in emission of a beta-plus particle (positron) having a maximum energy of around 545 keV, and a gamma-ray having an energy around 1274 keV. Subsequent matter-anti-matter annihilation of the positron further results in the emission of a pair of 511 keV gamma-rays. In this example the radioactive material 30 has an activity of around 100 Bq. This will of course reduce with time, with Na-22 having a half-life of around 2.6 years.

The radioactive material 30 is mounted on a substrate 28. In this example, the substrate 28 comprises a thin (e.g. <<1 mm, for example 0.05 mm) plastic (e.g. polyester) or metal sheet with the radioactive material in the form of a salt deposited thereon. The radioactive material is laminated over to seal the radioactive material 30 in a polyester envelope in this example.

The substrate 28 is sandwiched between two solid state silicon detector elements 22A, 22B so as to provide a solid state detector generally surrounding the radioactive material 30 and so arranged to receive positrons emitted by the radioactive material 30. In this example, the two solid state silicon detector elements 22A, 22B each comprise broadly conventional and commercially available P-Intrinsic-N (PIN) photodiodes. For example, in one embodiment the inventors have used solid-state detectors based on the S3590-19 model available from Hamamatsu Photonics K. K.®. The solid-state detectors are operated, e.g. supplied with power, in accordance with their normal operation for photon detection. The silicon detector elements 22A, 22B each comprise a silicon-based detector crystal 26A, 26B mounted in a cup-like ceramic housing 24A, 24B, thus leaving one face of the respective detector crystals 26A, 26B exposed. The exposed faces are those facing the radioactive source 30. The faces of the detector crystals 26A, 26B exposed by their respective housings 24A, 24B are, in this example, naked. That is to say, the detector surfaces are not encased in a resin encapsulant. In the configuration shown in FIG. 2, the exposed faces are perpendicular to the plane of the figure. The faces in this example are generally square with a side length of around 10 mm. In other embodiments different shaped detectors may be used in place of the detectors 22A, 22B seen in FIG. 2. For example, generally circular detectors having a similar characteristic extent, e.g. having a diameter of around 10 mm, may be used. The exposed faces of the silicon crystals 26A, 26B are separated from one another in this example by around 0.6 mm. The overall thickness of the detector assembly in this embodiment is around 3.6 mm.

The characteristic extent of the radioactive source material 30 is relatively small compared to the characteristic extent of the detector crystals 26A, 26B. The radioactive source material 30 is positioned broadly adjacent the centres of the two detector crystals 26A, 26B. Thus the overall sensitive region of the detector assembly subtends a solid angle seen by the radioactive source which is approaching $4\pi$ steradians, e.g. in excess of 95% of a closed surface around the radioactive material 30 for the geometry shown in FIG. 2.

Signal output lines from the detectors are 22A, 22B are coupled together and to a gating circuit 32. The gating circuit comprises a signal amplifier 34 for amplifying signals from the detectors 22A, 22B. The amplifier may be of any kind conventionally used with PIN photo-diodes. The output from the amplifier 34 is coupled to an input of a discriminator 36. The discriminator 36 may similarly be of any conventional kind and is configured to output a logic-level indication when the input to the discriminator 36 from the amplifier 34 exceeds a threshold level, e.g. a desired threshold voltage selected by adjusting a variable resistor associated with the discriminator 36.

Figure 3:
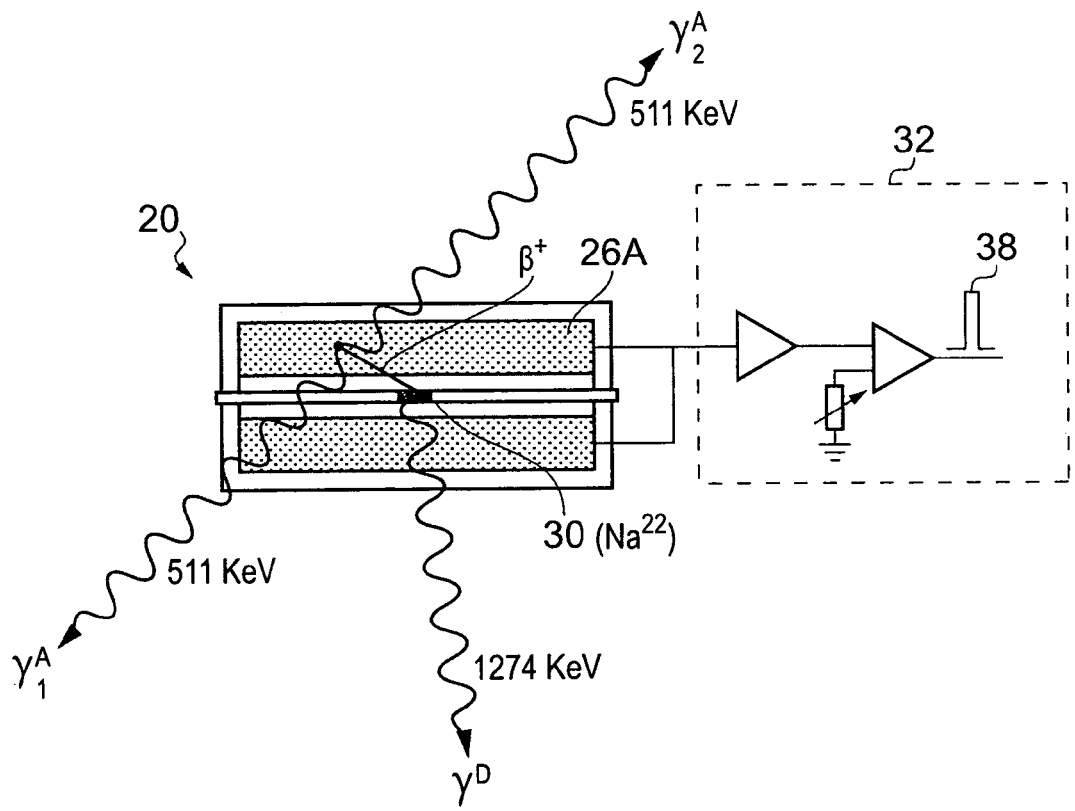
FIG. 3 schematically shows the calibration source shown in FIG. 2 during a calibration event.

FIG. 3 is similar to and will be understood from FIG. 2, but shows the calibration source 20 shown in FIG. 2 during a calibration event, i.e. a nuclear transition within the radioactive material 30. As noted above, Na-22 has a nuclear decay transition that is associated with emission of a 1274 keV gamma-ray ($\gamma^D$) and a positron ($\beta^+$), which may subsequently annihilate to two 511 keV annihilation gamma-rays ($\gamma^A$), i.e.

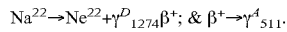

Na$^{22}$→Ne$^{22}$+$\gamma^D_{1274}\beta^+$; & $\beta^+$→$\gamma^A_{511}$.

Thus, as schematically shown in FIG. 3, a Na-22 nucleus in the radioactive material 30 decays by emitting a 1274 keV gamma-ray $\gamma^D$ and a positron $\beta^+$. The decay gamma-ray $\gamma^D$ readily escapes the calibration source in an arbitrary direction. Positrons emitted from Na-22 typically have a relatively high kinetic energy, e.g. up to 545 keV. A positron $\beta^+$ will perhaps require around 40 keV in kinetic energy to escape from the radioactive material 30 and surrounding polyester envelope. This is a relatively small amount compared to the typical kinetic energy of a Na-22 positron. Thus the majority of positrons will readily escape from the radioactive material 30 (the positron cannot annihilate until it is approaching rest because of momentum consideration). The relatively-high-energy end-point of its $\beta^+$ spectrum is one advantage of using Na-22.

The positron $\beta^+$ also escapes the radioactive material 30 in an arbitrary direction. However, because the sensitive region of the solid state detector assembly 22A, 22B subtends a large solid angle about the radioactive material, the positron $\beta^+$ will, for the geometry shown in FIGS. 2 and 3, enter the sensitive region of the detector assembly 22A, 22B (i.e. the volumes of the silicon detector crystals 26A, 26B) with a probability in excess of 95%. In FIG. 3 the positron $\beta^+$ is schematically shown entering the upper detector crystal 26A. The positron $\beta^+$ deposits kinetic energy as it moves through the upper detector crystal 26A before approaching rest, when it annihilates with an electron in the detector crystal 26A. This results in the emission of a pair of 511 keV annihilation gamma-rays $\gamma_1^A$, $\gamma_2^A$, as schematically shown in the figure. The annihilation gamma-rays $\gamma_1^A$, $\gamma_2^A$ are emitted in arbitrarily aligned opposite directions and readily escape the calibration source 20.

The kinetic energy of the positron $\beta^+$ lost in the depletion region of the biased detector crystal generates an output signal in broadly the same way as energy from a photon would do were the PIN photodiode being used for photon detection. The signal is amplified by the amplifier 34 and passed on to the discriminator 36. If the amplified signal exceeds the detection threshold that has been set for the discriminator 36, the discriminator outputs a pulse 38. The pulse 38 may be referred to as a gating/trigger pulse G. The characteristics of the pulse, e.g. its, amplitude, whether it is positive- or negative-going, its duration, etc., may be configured in accordance with known techniques for generating trigger pulses, e.g. for (anti-)coincidence timing in radiation detectors generally. Here it will be assumed the gating pulse is positive-going with a 5 v logic-level amplitude and a duration of 1 µS.

The net result of the calibration event in the radioactive material is thus a gating pulse 38 from the gating circuit 32, and three gamma-rays, namely a 1274 keV Na-22 radioactive decay gamma-ray $\gamma^D$, and first $\gamma_1^A$ and second $\gamma_2^A$ positron-electron 511 keV annihilation gamma-rays. The inventors have found with the above-described calibration source that the rising edge of the gating pulse occurs about 0.5 µS or so after the nuclear decay event. The three gamma-rays are to all intents and purposes emitted simultaneously with the nuclear decay event.

Three gamma-rays and a gating signal can be expected in >95% of the Na-22 decays for the geometry shown in FIGS. 2 and 3. This is because >95% of positrons deposit energy in the solid state detector 22A; 22B (assuming an appropriately set trigger threshold for the discriminator 36). These >95% of cases may be referred to as captured calibration-source decay events. In the remaining <5% cases, the positrons do not deposit any (or enough) energy in the solid state detector 22A; 22B to trigger the gating circuit. This might happen because the positron is emitted in a direction that is close to parallel with the detectors 22A, 22B so that it "escapes" through the gap between the detector crystals 26A, 26B, or simply because it is a relatively low-energy positron. The net result of each Na-22 decay in theses cases is same three gamma-rays, but without any gating pulse. These <5% of cases may be referred to as non-captured calibration-source decay events.

The ratio of captured events to non-captured events is primarily governed by the geometry of the detector assembly (i.e. the extent to which the detector crystals 26A, 26B together surround the radioactive material 30 without leaving gaps), and the ease with which positrons can escape the radioactive material 30 and surrounding envelope. In the example shown in FIGS. 2 and 3, the ratio of captured events to non-captured events is around 20:1. Generally speaking, the higher the ratio of captured events to non-captured events, the better the performance of the calibration source.

Figure 4:
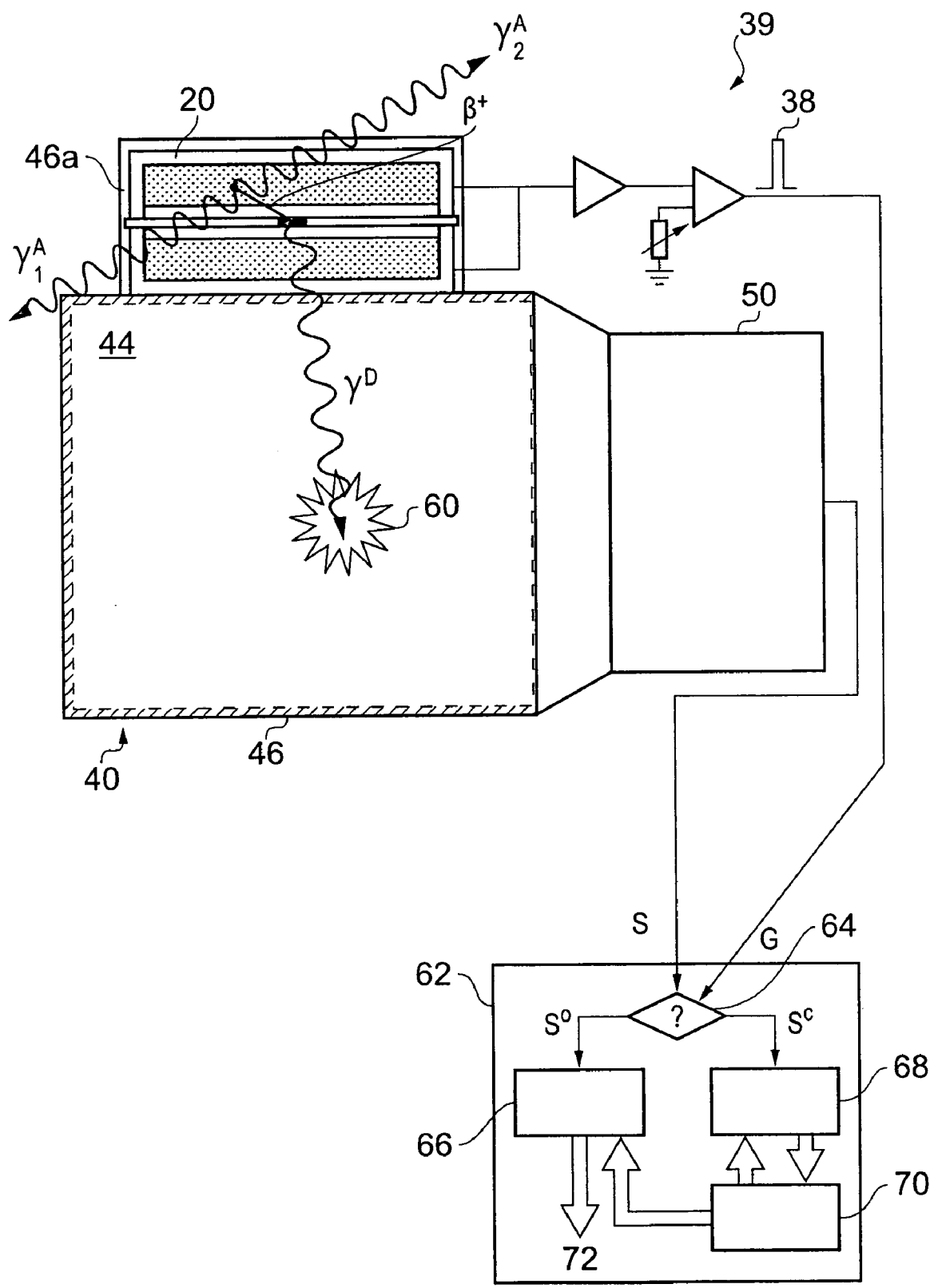
FIG. 4 schematically shows the calibration source shown in FIG. 2 in use with a gamma-ray spectrometer according to an embodiment of the invention.

FIG. 4 schematically shows an apparatus 39 comprising the calibration source 20 and a broadly conventional gamma-ray spectrometer 40. The calibration source 20 and the gamma-ray spectrometer 40 are not shown to scale. (The main body of calibration source 20 comprising the solid state detector will in general be relatively smaller than schematically shown in the figure). In this example the gamma-ray spectrometer 40 is a scintillator crystal-based gamma-ray spectrometer, but similar principles can be applied for response-stabilisation of other gamma-ray spectrometers based on other technologies, e.g. based on hyper-pure germanium detectors. The calibration source 20 and components of the gamma-ray spectrometer 40 are in this example contained within a common housing 46, e.g., an aluminium casing, so as to provide the self-contained apparatus comprising a combined calibration source and gamma-ray spectrometer. In the more general case, the calibration source and in spectrometer may be in separate housings. For example, the spectrometer may be of a conventional design within a conventional housing, and the calibration source may simply be attached or held against a side of the spectrometer housing.

The spectrometer component 40 of the apparatus 39 comprises a conventional scintillation crystal 44 which scintillates when a gamma-ray is absorbed within it. In this example, the scintillation crystal material is thallium doped sodium iodide (NaI(Tl)). Other scintillator crystals, or scintillator plastics, could equally be used.

The scintillation crystal 44 is optically coupled to a PMT 50 in any of the usual ways, e.g. directly or via an optical coupling element. In other examples, a solid state photodetector may replace the PMT 50. The scintillation crystal 4 is mounted in the housing 46. The housing has a region 46A for receiving the calibration source 20 in a position adjacent the scintillation crystal 44. The scintillation crystal 44 is packed in $Al_2O_3$ powder (schematically shown hatched in the figure) arranged to act as a reflective material, again in the usual way. As is conventional, gamma-rays interact with the scintillation crystal 44 in scintillation events in which lower-energy photons are generated, e.g. optical photons. The scintillation crystal 44 is optically coupled to the PMT 50. The PMT 50 is operable to output a signal indicative S of the intensity of the scintillation flash generated in the crystal 46 in response to each gamma-ray interaction. In this example, the output signal from the PMT is based on an integration time of around 1.5 μS, that is to say, the initial signal processing component of the PMT 50 (not shown in the figure) integrates the signal (current) seen at the anode of the PMT for around 1.5 μS to provide the output signal S. This integration time is based, for example, on the temporal response characteristics of the scintillation crystal 44 in the usual way.

FIG. 4 schematically shows the calibration source/gamma-ray spectrometer assembly 39 during a captured calibration-source decay event of the kind schematically shown in FIG. 3. As noted above, a captured calibration-source decay event is associated with a electronic gating signal G represented by a trigger pulse 38 and three (in effect) instantaneous gamma-ray emissions (one at 1274 keV and two at 511 keV). The gamma-rays are emitted in arbitrary directions (subject to the proviso that the two 511 keV annihilation gamma-rays are emitted in opposite directions). Thus there is a chance of one or more gamma-rays associated with a nuclear decay event in the radioactive material entering the scintillation crystal 46 and giving rise to a corresponding output signal S. In the example schematically shown in FIG. 4, the 1274 keV decay gamma-ray $\gamma^D$ is shown generating a scintillation event 60 in the scintillation crystal, while neither of the 511 keV annihilation gamma-rays $\gamma_1^A, \gamma_2^A$ enter the crystal. The gating pulse G from the gating circuit can thus be used as an indicator that a radioactive decay has occurred in the calibration source 20, and as such any gamma-ray energy deposit in the gamma-ray spectrometer 40 which occurs within a time window defined by the gating signal (e.g. simultaneously with) may be taken to be associated with the radioactive isotope. The time window may be configured having regard to the temporal characteristics of the of the gating signal and the spectrometer response in the usual way for (anti-)coincidence detection techniques. Thus in effect, the gating signal G may be used to tag gamma-ray detections occurring in the spectrometer 40 as being associated with a decay in the calibration source.

Thus the apparatus 39 further comprises a processor 62 arranged to receive gating signals G from the gating circuit of the calibration source and output signals S from the PMT 50 of the spectrometer 40. The processor 62 comprises a signal routing switch 64 for routing output signals S from the PMT 50 to one of two multi-channel analysers (MCA) 66, 68 in dependence on whether or not the output signals S occur in coincidence with a gating signal G. This is the output of primary interest. (It will be appreciated that the various functional blocks of the processor 62 of the apparatus 39 are shown separately in FIG. 4 primarily for ease of explanation. In some embodiments the functionality of these elements may, for example, be provided by a single hardware element, e.g. a suitably programmed processor of a general purpose computer.)

Output signals S that do not occur in coincidence with a gating signal G are routed to the first MCA 66. Since these output signals are not associated with a gating signal G, they are assumed to relate to radiation in the environment being observed by the gamma-ray spectrometer 40, for example, in an item of cargo at a port, and not calibration source decay events. Thus the output signals routed to the first MCA 66 correspond with the events of primary interest, and may be referred to as observed signal events $S^O$. The first MCA 66 is thus operable to generate an energy-loss spectrum 72 for the observed signal events $S^O$.

Output signals S that do occur in coincidence with a gating signal G are routed to the second MCA 68. Since these output signals are associated with a gating signal G, they are assumed to relate to an event in the calibration source. These events may be referred to as calibration signal events $S^C$.

The second MCA 68 is operable to generate an energy-loss spectrum for the calibration signal events $S^C$, for example in the usual way and in accordance with a nominally assumed calibration function for the spectrometer. However, significantly there are only a few possible energy depositions that can be associated with the calibration events, and furthermore these energies are known (or at least their respective maxima are known). For the geometry shown in FIG. 4, there are four possible energy depositions in the scintillation crystal 44. These are:

(i) 0 keV (none of the three gamma-rays interact with the scintillation crystal 44, i.e., they all "miss")—these events may be ignored;

(ii) 511 keV (one of the annihilation gamma-rays $\gamma_1^A, \gamma_2^A$ only interacts with the scintillation crystal);

(iii) 1274 keV (the decay gamma-ray $\gamma^D$ only interacts with the scintillation crystal—as shown in FIG. 4);

(iv) 1785 keV (one of the annihilation gamma-rays $\gamma_1^A$, $\gamma_2^A$ and the decay gamma-ray $\gamma^D$ interact with the scintillation crystal);

It may be noted for the geometry shown in FIG. 4 that it is not possible for both annihilation gamma-rays $\gamma_1^A$, $\gamma_2^A$ to interact with the scintillation crystal because they are oppositely directed. For other geometries (e.g. with a calibration source recessed within an opening in a scintillation crystal), both annihilation gamma-rays $\gamma_1^A$, $\gamma_2^A$ may deposit energy in the scintillation crystal at the same time. Thus there will be two further possible energy depositions in the scintillation crystal, namely:

(v) 1022 keV (both annihilation gamma-rays $\gamma_1^A$, $\gamma_2^A$ interacts with the scintillation crystal and the decay gamma-ray $\gamma^D$ does not); and (vi) 2296 keV (all three gamma-rays interact with the crystal).

However, for the geometry shown in FIG. 4 the second MCA 68 would generate a spectrum containing three peaks (corresponding to energy depositions of 511 keV, 1274 keV and 1785 keV). Spectra from the second MCA 68 are output to a stabilisation controller 70. The stabilisation controller 70 is operable to compare the locations of peaks (or edges in the event there are significant Compton scattering, such as in polyvinyl toluene (PVT), the scintillation body) in the spectrum of calibration signal events from the second MCA 68 with the known possible energy deposits for the calibration events. The stabilisation controller 70 is further operable to determine from the comparison what correction factors (which may be energy dependent) are needed to align the calculated calibration event energies with their known values. in doing this the stabilisation controller 70 may operate in accordance with the well-understood general principles for gain stabilisation in gamma-ray spectrometers based on calibration spectra. Significantly, however, the processor 62 in accordance with embodiments of the invention is operable to modify the spectrometer response to apply corrections for gain stabilisation in real time (depending on integration period for obtaining a calibration spectrum), and in parallel with obtaining a spectrum of observed signal events (i.e. the spectrum of interest). Furthermore, this is achieved with little contamination of the spectrum of observed signal events. The only contamination of the spectrum of interest comes from the non-captured calibration events. This is because these events may be associated with an energy deposit in the scintillation crystal which is not accompanied by a gating signal G. As such, output signals associated with these events may be routed by the switch 64 to the first MCA 66 responsible for processing the observed signal events.

Thus as schematically indicated in FIG. 4, the processor 62 is configured such that the stabilisation controller 70 feeds calibration/stabilisation information derived from the comparison of calculated calibration source event energies with their known energies back to the first and second MCAs 66, 68. Thus subsequent spectra are generated by the two MCAs in a manner that takes account of the correction factors determined by the stabilisation controller 70. For example, if the stabilisation controller were to determine that the energies calculated from the spectrum of calibration event signals were all too low by 10%, the two MCAs could be configured to "stretch" their spectra by 11% to compensate. This could be done numerically within the respective MCAs 66, 68 under feedback from the stabilisation controller 70, or in hardware. For example, the gain of the PMT 50 could be varied, e.g. to increase output signals by 11% in response to a finding by the stabilisation controller 70 that the energies calculated from the spectrum of calibration event signals were all too low by 10%.

It will be appreciated that the above-described example based on two MCAs is only one example of how the calibration signal events and the observed signal events may be separately handled. In practice there may only be one MCA that handles all signal events from the PMT, with the outputs from the MCA then classified as calibration signal events or observed signal events depending on whether or not there is a coincident gating signal. Outputs from the single MCA could then be routed to different memory elements for storage and subsequent spectrum generation accordingly. In another example, a single MCA may be operated in list mode to provide for each signal from the PMT an indication of signal strength and whether or nor the event is associated with a coincident gating signal. This list output from the MCA could then be stored in memory and processed later. The later processing can then be responsible for classifying the events as calibration signal events and the observed signal events based on the gating signal indicator. As above, a spectrum of calibration signal events can then be sued to stabilize/calibrate a spectrum of the observed signal events.

Thus in accordance with embodiments of the invention, a spectrum 72 of observed signal events (the signal of interest) may be automatically stabilised in parallel with the stabilisation spectrum of the calibration signal events. The spectrum 72 may be processed, displayed, etc., in accordance with known techniques according to the implementation at hand. For example, the apparatus may be a hand-held radiation detector for scanning cargo/people at a port. On switch on, the spectrometer component 40 of the apparatus 39 may produce an output spectrum via the first MCA 66 for an integration time selected in the usual way, for example, an integration period of 10 seconds may be used based on expected count rate. For a 100 Bq strength radioactive material 30 in the calibration source 20, there will be around 1000 decay events in this period. With a >95% positron capture efficiency, there will be >950 calibration signal events. These may be used to produce a calibration spectrum via the second MCA 68. Comparison of calculated energies for features in the calibration spectrum (e.g. peaks or Compton edges) with their expected energies provides calibration information for the spectrometer. This may be applied to the output spectrum 72 obtained in the next 10 second integration period, or indeed applied to the output spectrum 72 obtained in the current 10 second integration period.

In other examples, calibration may be performed more frequently than the integration period for the observes signal events. For example, with stabilization based on changing the gain of the data acquisition system (e.g. PMT gain), the gain may be changed based on each and every calibration output signal. In this case a second MCA is not required for the calibration output signals. Instead, each calibration output signal is mapped back to an energy based on the spectrometers nominally assumed response function. This is compared with the known possible energy depositions, and assumed to be associated with the nearest one. A gain correction factor is then determined from the difference between them, and the gain of the data acquisition system modified accordingly.

In other example, the MCAs may generate accumulation-type spectra as opposed to fixed integration-time spectra. Correction/stabilisation factors to apply to the accumulating output spectrum 72 of observed signal events may be continuously applied according to the accumulating spectrum of calibration signal events.

It will be appreciated that other radioactive source materials which decay by simultaneously emitting a particle (not necessarily a positron) and a gamma-ray could also be used. For example Co-60 or Cs-137 could be used. An advantage of Na-22 is that it emits an anti-particle in its decay. This annihilates to generate two 511 keV gamma-rays which can also provide calibration information. Cs-137, for example, decays (via an intermediate state) by emitting an electron and a 662 keV gamma-ray. The electron can be detected in the solid state detector of a calibration source such as shown in FIG. 2 to provide a gating signal in the same way as described above for the positron in a Na-22 decay, but there will be no 511 keV annihilation gamma-rays. Thus only the 662 keV gamma-ray can be used for calibration purposes. This provides a single-point calibration. However, in some cases a multi-point calibration (i.e. having multiple calibration energies) may be preferred, e.g. to provide for energy-dependent stabilisation. In some examples a mixture of radioactive isotopes could be used in the radioactive material of the calibration source to provide an increased number of potential calibration points (i.e. an increased number of different possible energy depositions in the calibration event spectrum).

Thus as described above, a suitable radioactive source for use in a calibration source according to an embodiment of the invention, can be prepared by depositing, for example, an aqueous solution containing Co-60, Cs-137 or Na-22 salts onto a thin (50 μm) plastic film or metal foil. After the solvent has evaporated, a weakly-radioactive gamma- and beta- ($\beta^-$ and/or $\beta^+$) source remains at the centre of the film and can be sealed by laminating a second layer of film onto the substrate. The source, supported within this laminated structure, can then be bonded between the ceramic rims of two face-to-face silicon PIN diodes, for example Hamamatsu (Type 3590-19). These can be supplied without any overlying epoxy coating on the active silicon so that when biased, the beta particles produced by the source will typically lose no more than 50 keV before reaching the depletion region of the biased diodes. By providing such a low energy threshold, one can help ensure that the gamma-rays generated by the source can be tagged efficiently (e.g. >95% capture rate), and so cause relatively low contamination of a spectrum being studied. The charge deposited by the beta in the silicon can be amplified using conventional electronics to generate a gating signal indicating a gamma-ray has been emitted from the calibration source. This signal can be used to classify events detected in a nearby gamma-ray spectrometer into two groups containing (a) calibration events; or (b) non-calibration events (observed signal events). An example of how such a tagged gamma-ray source might be constructed, is illustrated in FIG. 2 based on two Hamamatsu PIN photodiodes (S3590-19). These photodiodes 22A, 22B are each mounted in a shallow ceramic well 24A, 24B. In this example, the silicon is not encapsulated in epoxy resin. This provides space into which the radioactive material 30 can be introduced. By using two face-to-face diodes, the probability of detecting particles emitted by the source material 30 is increased. However, in implementations where one is not concerned about the level of untagged gamma-rays that are emitted (i.e. if the level of potential contamination of an observed spectrum at the energies of the calibration isotope emission(s) is not of concern), one could use only a single PIN photodiode, e.g. sealed using a metal plate. In other cases where increased capture efficiency may be required, more than two particle detectors may be used to still better surround the radioactive material.

Outputs from the PIN photodiodes in response to detection of a particle can be read-out using a single preamplifier shaping amplifier to provide a standard digital tagging signal. These few components can be combined into a single compact module that can be positioned close to the spectrometer to be calibrated. The spectrum of tagged events may be accumulated at a rate of around 100 events/s (i.e. for a 100 Bq source with high capture efficiency) to stabilize the gain of the instrument in event a rapidly changing environment.

Thus a calibration source for a gamma-ray spectrometer has been described. The calibration source comprises a radioactive material comprising a radioactive isotope having a decay transition associated with emission of a radiation particle and a gamma-ray having a known energy, e.g. Na-22, and a solid-state detector, e.g. a PIN photodiode, arranged to receive radiation particles emitted from the radioactive material. A gating circuit is coupled to the solid-state detector and is operable to generate a gating signal in response to detection of a radiation particle in the solid-state detector. The gating signal may thus be used as an indicator that an energy deposit in a nearby gamma-ray spectrometer is associated with a decay transition in the radioactive isotope. Since these energy deposits are of a known energy, they can be used as reference points to calibrate the spectrometer response. Thus with calibration sources according to embodiments of the invention, spectral stabilization (i.e. accounting for a changing spectrometer response, as well as base calibration) may be performed in real time and in parallel with obtaining a spectrum of observed signal events (i.e. the spectrum of interest). Furthermore, this is achieved with little contamination of the spectrum events of interest.

REFERENCES

[1] Forrest, D., J., et al, *The gamma-ray spectrometer for the solar maximum mission*, Solar Physics 65, pp. 15-23, 1980
[2] Amcrys-H, 60 Lenin Ave, Kharkov 310001, Ukraine. See http://www.amcrys-h.com/Main_Frame.htm
[3] Poulsen, J. M., et al, *IBIS calibration unit on INTEGRAL Satellite*, Proceedings $4^{th}$ INTEGRAL workshop. ESA SP_459, September 2001

The invention claimed is:

1. An apparatus comprising a calibration source and a gamma-ray spectrometer, comprising: a radioactive material comprising a radioactive isotope having a decay transition associated with emission of a radiation particle and a gamma-ray having a known energy; a solid-state detector arranged to receive radiation particles emitted from the radioactive material; and a gating circuit coupled to the solid-state detector, and wherein the gating circuit is operable to generate a gating signal in response to detection of a radiation particle in the solid-state detector, and to output the gating signal for receipt by a data acquisition circuit of a gamma-ray spectrometer to indicate that gamma-ray detection in the gamma-ray spectrometer occurring within a time window defined by the gating signal is associated with a decay transition in the radioactive isotope, wherein the gamma-ray spectrometer comprises a data acquisition circuit operable to process detection signals associated with gamma-ray detections occurring within time windows defined by the gating signal, to calculate an energy spectrum for the detection events, to compare the calculated energy spectrum for the detection events with the known energies of gamma-rays associated with the radioactive material in the calibration source, and to determine correction factors for the data acquisition circuit for multiple energies based on differences between the calculated energies and the known energies.

2. An apparatus according to claim 1, wherein the solid state detector comprises first and second detector elements on opposing sides of the radioactive material.

3. An apparatus according to claim 1, wherein the solid-state detector is a silicon-based detector.

4. An apparatus according to claim 1, wherein the solid-state detector is a P-Intrinsic-N (PIN) diode-based detector.

5. An apparatus according to claim 1, wherein the gating circuit comprises a signal amplifier and a signal discriminator.

6. An apparatus according to claim 1, wherein the solid-state detector is arranged around the radioactive material so as to subtend a solid angle of at least a fraction selected from the group comprising 0.5, 0.6, 0.7, 0.8, 0.9 and 0.95 of a closed surface.

7. An apparatus according to claim 1, wherein a characteristic extent of the solid-state detector is greater than a characteristic extent of the radioactive material by a factor selected from the group comprising at least 5, 6, 7, 8, 9 and 10.

8. An apparatus according to claim 1, wherein the radiation particle is a beta particle.

9. An apparatus according to claim 8, wherein the radiation particle is a beta-plus particle.

10. An apparatus according to claim 1, wherein the radioactive isotope Na-22.

11. An apparatus according to claim 1, wherein the radioactive material has a radioactivity level in a range selected from the group comprising 10 Bq to 500 Bq, 50 Bq to 300 Bq, and 75 Bq to 150 Bq.

12. An apparatus according to claim 1, wherein the radioactive material is sealed in a housing.

13. An apparatus according to claim 12, wherein the housing comprises a laminated plastic film.

14. A method of calibrating a gamma-ray spectrometer comprising:
providing a solid-state detector arranged to receive radiation particles emitted from a radioactive material comprising a radioactive isotope having a decay transition associated with emission of a radiation particle and a gamma-ray having a known energy:
generating a gating signal in response to detection of a radiation particle in the solid-state detector;
identifying a gamma-ray detection in the gamma-ray spectrometer occurring within a time window defined by the gating signal;
calculating an energy spectrum for gamma-ray detection events identified as occurring within time windows defined by the gating signal by processing detection signals associated with the gamma-ray detections in a data acquisition circuit of the gamma-ray spectrometer;
comparing the calculated energy spectrum for the gamma-ray detections with the known energies of gamma-rays associated with the radioactive material in the calibration source; and
determining correction factors for the data acquisition circuit for multiple energies based on differences between the calculated energies and the known energies.

* * * * *